United States Patent [19]
Izawa et al.

[11] Patent Number: 5,420,406
[45] Date of Patent: May 30, 1995

[54] BILL VALIDATOR WITH BAR CODE DETECTOR

[75] Inventors: Hikaru Izawa, Hadano; Masanobu Fujita, Kawasaki; Toitsu Ohya, Isehara, all of Japan

[73] Assignee: Japan Cash Machine Co., Ltd., Osaka, Japan

[21] Appl. No.: 174,397

[22] Filed: Dec. 28, 1993

[30] Foreign Application Priority Data

Dec. 28, 1992 [JP] Japan .................................. 4-349122

[51] Int. Cl.$^6$ .............................................. G06F 15/30
[52] U.S. Cl. .................... 235/379; 235/449; 235/454; 235/468
[58] Field of Search ............... 235/379, 468, 381, 480, 235/454, 449, 493

[56] References Cited

U.S. PATENT DOCUMENTS

| | | | |
|---|---|---|---|
| 3,163,758 | 12/1954 | Treacy | 235/468 |
| 3,760,161 | 9/1973 | Lohne et al. | 235/468 |
| 4,480,177 | 10/1984 | Allen | 235/468 |
| 4,482,058 | 11/1984 | Steiner | 235/480 |
| 4,627,819 | 12/1986 | Burrows | 235/468 |
| 4,634,148 | 1/1987 | Greene | 235/468 |
| 4,809,837 | 3/1989 | Hayashi | 235/381 |

Primary Examiner—Harold Pitts
Attorney, Agent, or Firm—Bachman & LaPointe

[57] ABSTRACT

A bill validator which may validate bills and bar coded documents is provided. A central processing unit of the bill validator comprises discriminator means for receiving outputs of sensor means for detecting magnetic or optical feature of the bills; and bar code detector for photoelectrically converting bar code pattern printed on a document. The discriminator means comprise an bar code comparator for receiving outputs of the optical sensors to detect bar code printed on a document; a magentic pattern memory for storing predetermined magnetic patterns; and bar code memory for storing predetermined bar code patterns. The bar code comparator compares bar code signals read out through optical sensors from the document with bar code signals stored in the bar code memory after or before the discriminator means decides whether the document is a genuine bill or not. When the bar code comparator detects coincidence of the bar code signals from the optical sensors and bar code memory, it generates coincident signal to supply a drive signal to the meter control circuit of the conveyor means in order to transport the bill to the outlet.

14 Claims, 4 Drawing Sheets

BILL VALIDATOR WITH BAR CODE DETECTOR

Background of the Invention

Field of the Invention

This invention relates to a bill checker, in particular to an improvement of a bill validator capable of validating bills and bar codes printed on documents such as coupons, valuable securities or negotiable papers.

DESCRIPTION OF THE PRIOR ART

Gift certificates detectable by a bill sorter are known as shown by U.S. Pat. No. 4,659,126 to K. Kachi et al. Prior art gift certificates which may be discriminated by a bill validtor, have letters and designs printed on a rectangular paper of its width passable within a passageway of the bill validator. The gift certificate is provided with first and second information rows detected by corresponding two magnetic heads equipped in the bill validator for detecting ferrous ink printed on bills. The first information row is printed to form information units at regular intervals in a line of the gift certificate with terrous ink. The second information row is printed with ferrous ink in blank portions between information units of the first information row on the gift certificates to indicate an equivalent amount to money and names of exchangeable goods and other information necessary to the gift certificate.

Also, Japanese Patent Disclosure No. 59-82392 by T. Misawa discloses a vending machine which comprises an inlet for receiving a gift certificate, a processing unit for magnetically reading out data printed on the certificate and a control unit for generating a selling signal in response to date read out by the processing unit.

U.S. Pat. No. 4,916,295 to P. Chominski discloses a document detecting arragement for detecting banknotes having magnetic properties, comprising transport means for transporting documents past a magnetic detector which includes a permanent magnet and magnetic circuit having detector means for detecting changes in the magnetic field through the magnetic circuit. An output of the detecting means is connected to a signal processing means for generating signals in response to the magnetic properties of bank notes transported through the arrangement.

U.S. Pat. No. 5,020,110 to P. Chominski shows an arrangement for examining bank-notes or similar documents including a detector such as CCD array of photocell devices. The documents are scanned by the photocell devices transversely of their longitudinal extent.

U.S. Pat. No. 5,091,634 describes coupon validation system for interpreting coupons each incorporating a bar code having a validation data and a message code. The system comprises a real time clock for maintaining a current date record, a memory for storing one or more wining number codes. apparatus for receiving a couponig presented to the system and in response reading the bar code, and a microcomputer for comparing the validation date with the current date record. When the current date record is not equal to the validation date, it rejects the coupon. When the current date record is equal to the validation date, it compares the one or more wining number codes with the message code. When they are equal, it generates a message for indicating that the coupon is a winner. When the one or more wining number codes and the message code are not equal, it generates an alternative message for indicating that the coupon is not a winner.

Japanese Patent Disclosure No. 53-33532 by V. Ponsio discloses an automatic validator utilizing an optical sensor to discriminate genuine and false coupons. The valdiator of this type comprises a memory for collection and storing "sample words" corresponding "sample coupons", means for transmitting the "sample words" to comparator memory means, means for optically scanning sectioned areas on a surface of a coupon to read out an optical feature thereof, converter means for converting the resulted signals from the scanning means to numeral data, microprocessor means for modifying the numeral data to a "word" and then for forwarding the word to the comparator memory means, and decision means for distinguishing genuine and false coupons. Japanese Patent Disclosure No. 60-220797 by K. Kachi et al. exhibits a discriminator device which detects by a magnetic head a series of information printed with ferrous ink on gift certificates. A series of the information includes indication of money amount or names of exchangeable goods printed on the gift certificates which also bear printed letters or design.

Since recent gift certificates bear bar code printed thereon for discrimination, it is necessary to validate gift certificates by automatically validating bar code printed thereon, however, no proposal has been made on a novel device which can validate both of bills and bar coded documents.

SUMMARY OF THE INVENTION

An object of the present invention is to provide a bill validator which may validate both of bills and barcoded documents.

Another object of the invention is to provide a bill validator which includes sensor means capable of detecting a magnetic feature of bills and an optical feature of bar coded documents.

A further object of the invention is to provide a bill validator which may validate bills and both surfaces of bar coded documents utilizing sensor means.

A still futher object of the invention is to provide a bill validator which may validate bills and bar coded documents from permeation pattern of infrared ray through the bills and reflection pattern of light on surfaces of the documents.

The bill validator in accordance with the present invention includes conveyor means for transporting a bill inserted from an outlet to an outlet along a passageway; sensor means positioned in vicinity of the passageway for detecting magentic or optical feature of the bill; and discriminator means for receiving signals from the sensor means to generate outputs in order to drive the conveyor means when the discriminator means detects a predetermined magnetic or optical pattern for a genuine bill. The discriminator means comprises a bar code detector for photoelectrically converting bar code pattern printed on a document inserted into the inlet into electric signals; a bar code memory for storing predetermined bar code patterns; an bar code comparator for comparing bar code signals read out through the bar code sensor with bar code signals stored in the bar code memory after or before the discriminator means decides whether the document is a genine bill or not. The bar code comparator generates a drive signal to the conveyor means to transport the document to the outlet when the bar code comparator detects coincidence of the bar code signals from the sensor means and bar code memory. The sensor means includes magnetic and optical sensors positioned in vicinity of the passageway for detecting magnetic and optical features of the bill; and infrared sensor which generates permeation pattern of infrared ray passing through the documents. Some of the optical sensors are positioned adjacent to the inlet or the bill validator. The discriminator means includes a ferrous detector for receiving outputs of the magnetic sensor to detect ferrous component of the bill. The bar code detector includes two bar code sensors positioned in parallel relation to each other for detecting bar code printed on one or both of the front and back surfaces of the document.

The discriminator means includes a bill memory for storing predetermined magnetic or optical patterns; a bill comparator for comparing magnetic or optical signals read out through the sensor means with bill pattern signals stored in the bill memory, the bill comparator generating a drive signal to the conveyor means to transport the bill to the outlet when the bill comparator detects coincidence of the bill pattern signals from the sensor means and bill memory. The optical sensor produces outputs which are used for validation of a bill. The bar code memory and the bar code comparator are provided in the discriminator means. The discriminator means detects bar code after or before detection of whether or not the document is a genuine bill. A motor encoder is provided to generate pulses in order to detect exact position of the document within the passage. Means may be provided to invalidate the document which is considered not valide. The sensor means includes at least an inlet signal capable of detecting overlapped bills from the amount of light passing through the bill. Accordingly, the bill validator of the present invention can discriminate both of bills and bar code documents for validation.

DETAILED DESCRIPTION OF THE INVENTION

Figure 1:
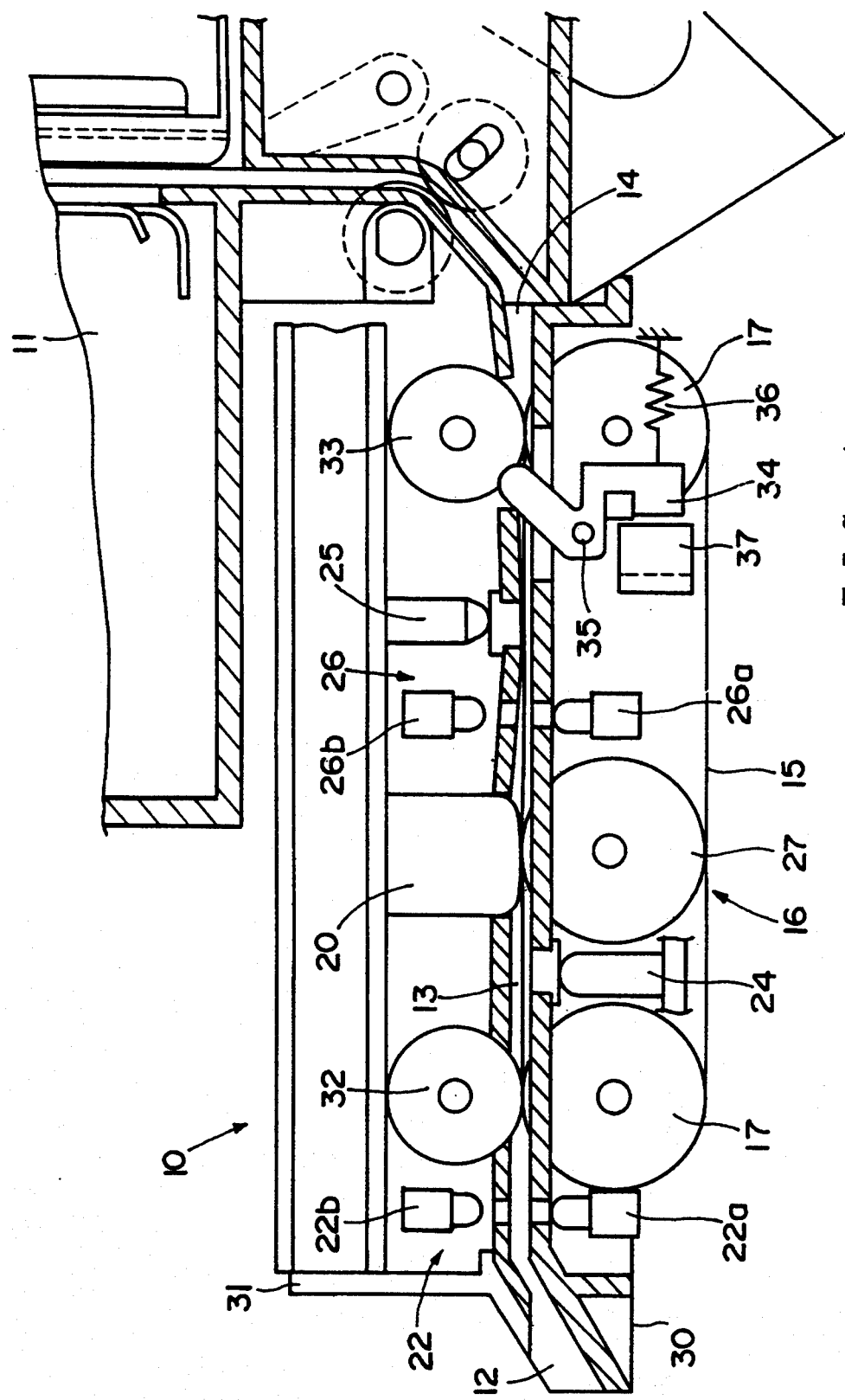
FIG. 1 is a sectional view of a bill validator according to the present invention.

Referring to FIG. 1 through 4, an embodiment of a bill validator according to the present invention will be described as follows:

The instant invention may be applied to a bill handling apparatus such as vending machines and bill exchangers. As shown in FIG. 1, the bill handling apparatus comprises a bill validator 10 and a stacker 11 mounted on the bill validator to connected therewith by a passageway 13 to transport a bill to be inserted from an inlet 12 to an outlet 14. The bill validator 10 has upper and lower frames 31 and 30 which support conveyor means 16 and a plurality of sensors. The passageway 13 is defined by the conveyor means 16 which includes a pair of conveyor belts 15 (FIG. 2) wound around a pair of drive pulleys 17.

Figure 2:
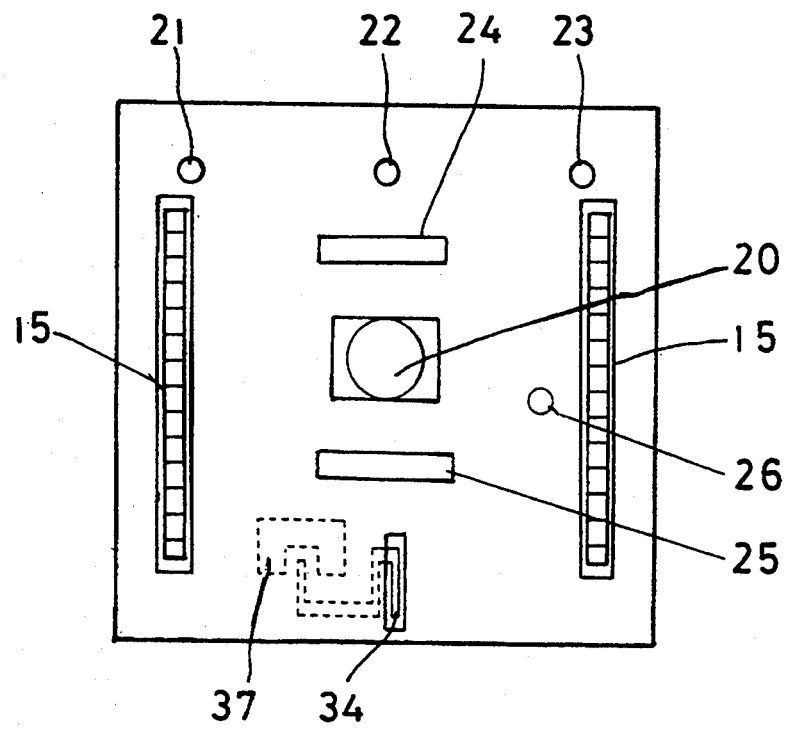
FIG. 2 is a plan view of the bill validator removing an upper frame thereof.

The bill validator 10 is equipped with a magnetic sensor 20 of a magnetic head or Hall IC mounted in vicinity of the passageway 13 to detect ferruos ink printed in predetermined positions of bills. As shown in FIG. 2, mounted on the frames 30 and 31 are three inlet sensors 21 to 23, bar code sensors 24 and 25 and infrared sensor 26 each of which is a photo-coupler including a light emitting diode (LED) and a light receiving transistor (LRT) so that the photo coupler photoelectrically converts into electric signals light which is reflected on or passed through a bill or a document. By measuring amount of light passed through the bill, overlapped bills of thickness of a bill inserted into the inlet 12 may be detected. The inlet sensors 21 to 23 are positioned adjacent to the inlet 12 to emit from LEDs of the sensors 21 to 23 infrared ray which then passes through a bill so that permeation pattern of infrared ray through bills is detected by LRTs of the inlet sensors 21 to 23. For instance, the inlet sensor 22 of FIG. 2 is composed of a LED 22a secured to a lower frame 30 of the validator 10 and a LRT 22b secured to an upper frame 31. The upper frame 31 is pivotally attached to the lower frame 30 by a shaft (not shown) to open the upper frame 31 and easily remove jammed bills within the passageway 13. Mounted on the lower frame 30 is the bar code sensor 24 which has a LED to emit a light beam toward a back surface of a document within the passageway and a LRT to receive the light beam from the LED reflected on the back surface of the bill. A similar bar code sensor 25 having a LED and a LRT is provided on the upper frame 31 in parallel relation to the bar code sensor 24 so that the LED of the bar code sensor 25 emits a light beam toward a front surface of the document within the passageway and the LRI of the bar code sensor 25 receives the light beam reflected on the front surface of the bill. Accordingly, the bar code sensors 24 and 25 optically detect bar code printed on either of one of the front and back surfaces of bills. An infrared sensor 26 has a LED 26a secured to the lower frame 30 and a LRT 26b secured to the upper frame 31 so that infrared ray emitted from the LED 26a passes through the bill and then is received by the LRT 26b to detect position and passage of the bill from the resulted permeation pattern of infrared ray. A pusher roller 27 urges the bill or document toward the magnetic sensor 20. Rollers 32, 33 are rotatably mounted on the upper frame 31 to the urge the bill document toward the conveyor belts 15 wound around the drive pulleys 17. A lever 34 is rotatably mounted by a shaft 35 to the lower frame 30 at the rear of the bar code sensor 25 to detect passage of the bill or document. One end of the lever 34 is connected with a tension spring 36 attached to the lower frame 30 so that the other end of the lever 34 is resiliently urged to project within the passageway 13. Traveling along the passageway 13, the bill or document forces the lever 34 to rotate in a clockwise direction against resilient force of the spring 36 during contact between the other end of the lever 34 and the bill or document so that it can pas the lever 34. A lever sensor 37 of a photocoupler optically detects one end of the rotated lever 34 when the bill passes the lever 34.

Figure 3:
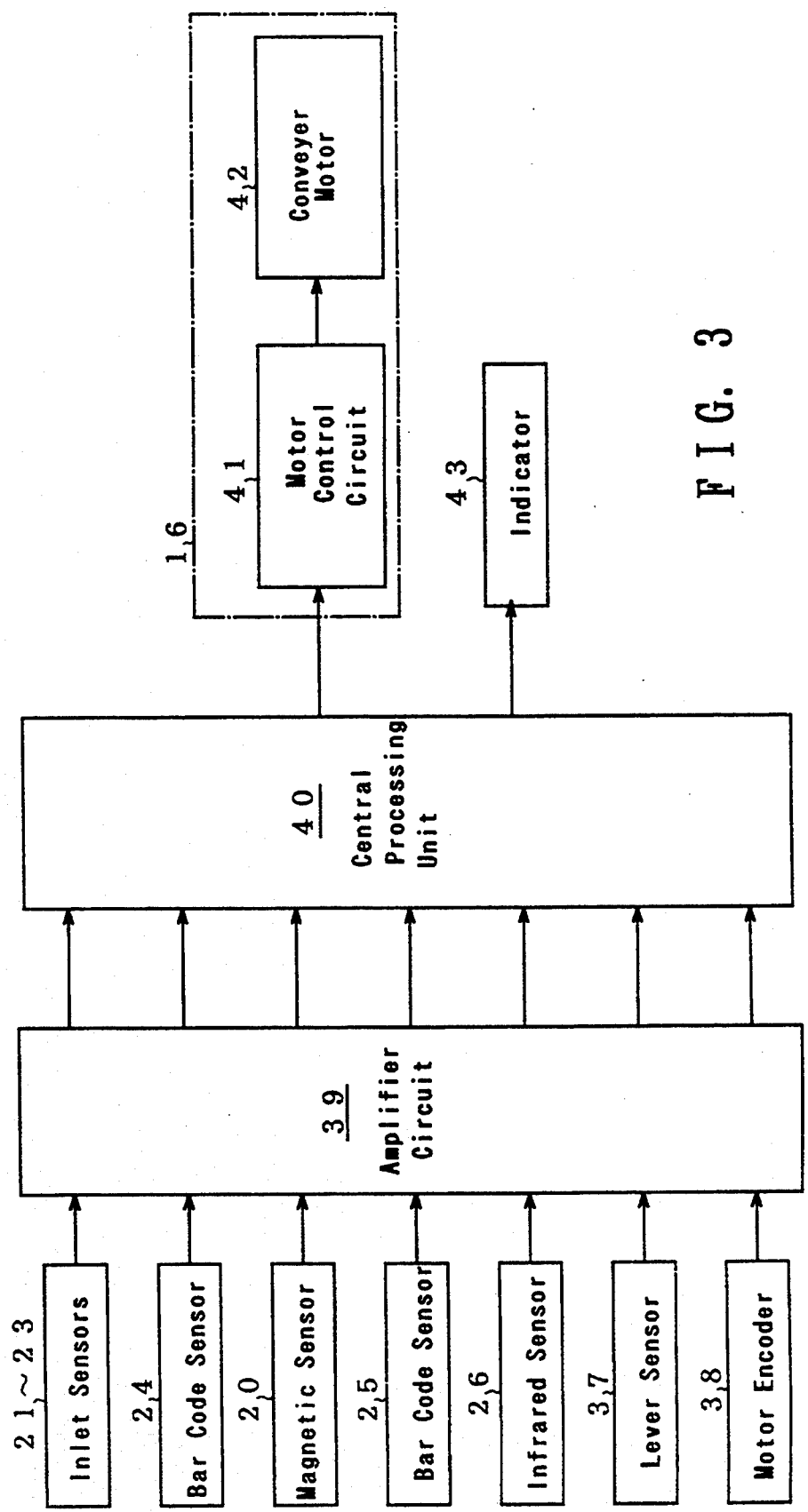
FIG. 3 is an electric circuit for electrically driving the validator of FIG. 1.

As shown in FIG. 3, the magnetic sensor 20, in inlet sensors 21 to 23, bar code sensors 24, 25 and infrared sensor 26, and lever sensor 37 are connected with corresponding input terminals of a central processing units (CPU) 40 which has output terminals respectively connected with a motor control circuit 41 of the conveyor means 16 and an indicator 43. The motor control circuit 41 produces outputs to energize a conveyor motor 42 which is drivinly connected with the drive pulleys 17. The indicator 43 has light emitting diodes or liquid crystal to represent money amount of kind of the validated bill and bar code data.

The CPU 40 is composed of a one-chip-microcomputer and discrete ICs or circuits which not shown but comprises discriminator means connected with inlet sensors 21 to 23, bar code sensors 24, 25, infrared sensor 26, lever sensor 37 and motor encoder 38 to generate outputs to drive the conveyor means 16 in response to the signals from inlet sensors 21 to 23, bar code sensors 24, 25, infrared sensor 26, lever sensor 37 and motor encoder 38. The motor encoder 38 electromagnetically or photoelectrically produces electric pulses in response to rotated angles of the motor so that the CPU 40 exactly detects the position of the inserted bill by counting pulses from the motor encoder 38 regardless of rotating rate of the motor. The CPU 40 includes a counter for counting the pulses generated by the motor encoder 38 after the outputs of the inlet sensors 21 to 23 occurs until the lever sensor 37 generates its output or until the inlet sensors 21 to 23 cease generation of their outputs of sensing th bill or document. The discriminator means include a ferrous detector for receiving outputs of the magnetic sensor 20 to detect ferrous component of ink printed in predetermined positions of the bill; a magnetic pattern memory for storing predetermined magnetic patterns; an bar code comparator for receiving outputs of the bar code sensors 24, 25 to detect bar code printed on a document; and bar code memory for storing predetermined bar code patterns. The bar code comparator compares bar code signals read out through bar code sensors 24, 25 from the document with bar code signals stored in the bar code memory. Ferrous ink and bar code are printed in predetermined positions of bills or coupons so that positions of ferrous ink and bar code are easily detected by counting pulses generated by the motor encoder 38 as the number of the counted pulses indicates exact position of the bill or document in the passageway 13. When the bar code comparator detects coincidence of the bar code signals from the bar code sensors 24, 25 and bar code memory, it generates coincident signal to supply a drive signal to the motor control circuit 41 of the conveyor means 16 in order to transport the bill to the outlet 14.

Figure 4:
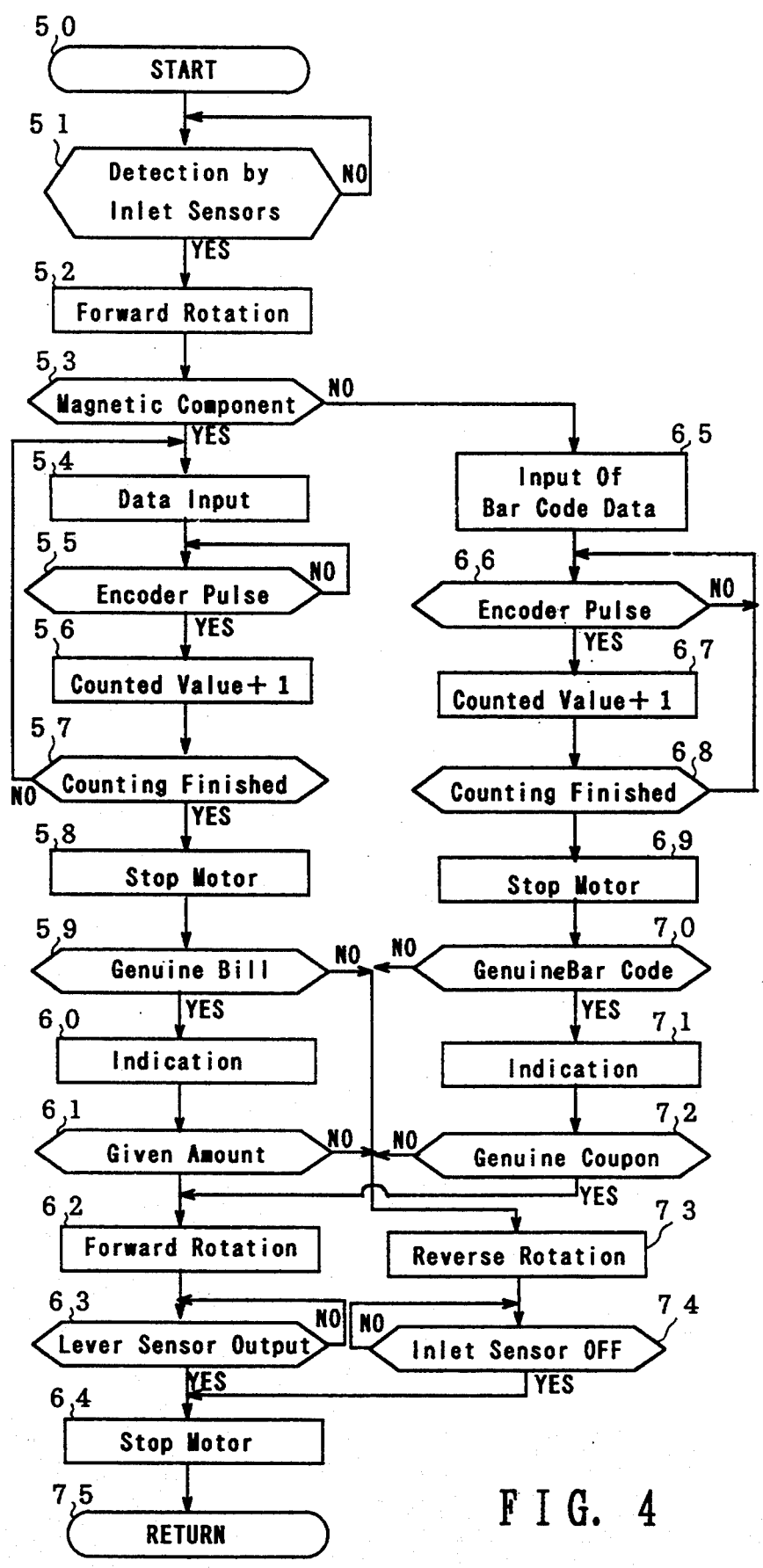
FIG. 4 is a flow chart indicating an operating sequence of the electric circuit of FIG. 3.

In use, the CPU 40 is operated in accordance with an operating sequence shown in a flow chart of FIG. 4.

The inlet sensors 21 to 23 detect a bill or bar coded document inserted into the inlet 12 and generate detection signals to the CPU 40 which then supplis the motor control circuit 41 with drive signals to rotate the conveyer motor 42 in the forward direction as shown in Steps 50 to 52 of FIG. 4. Thus, the drive pulleys 17 of the conveyor means 16 are driven in the clockwise direction in FIG. 1 so that the conveyor belt 15 is driven and the bill is moved toward the magnetic sensor 20. Then in Step 53, the CPU 40 decides whether or not the magnetic sensor 20 detects the ferrous component on the bill. When the magnetic sensor 20 detects the ferrous component on the bill, the CPU 40 determines that the document inserted into the inlet 14 is a bill. Then, in step 54, the CPU 40 receives outputs as data of the inserted bill from the magnetic sensor 20 and inlet sensors 21 to 23. The magnetic sensor 20 fowards a plurality of signals derived from the ferrous material of the bill to a bill memory of the CPU 40 which then stores these data.

In Step 55, the CPU 40 decides whether to receive pulses of the motor encoder 38 generated with rotation of the motor to detect exack position of the bill passing within the passageway 13. The counter of the CPU 40 counts the number of pulses from the motor encoder 38, adding one to the counted value of pulses (Step 56) in the counter each time detecting one pulse from the motor encoder 30. In Step 57, the CPU 40 judges whether or not the counter reaches a predetermined counted value, and when the counter does not reach the predetermined counted value, the processing returns to Step 54. When the counter reaches the predetermined counted value, the processing moves to Step 58 from 57 to finish the counting of pulses. In Step 58, the CPU 40 ceases drive signals to the conveyor motor 42 to steop operation of the conveyer motor 42, and subsequently the bill comparator of the CPU 40 compares the received magnetic detection signals with the predetermined magnetic patterns stored in the magnetic pattern memory to determine whether or not these patterns are coincident and thereby to determine whether the inserted bill is genuine or not (Step 59). After detection of the genuine bill in Step 59, the CPU 40 also decides a kind of bills or money amount from the detected magnetic pattern, and as a result forwards to signals to the indicator 43 which therefore indicates the kind of the bill or money amount (Step 60).

In Step 61, the CPU 40 determines whether or not the bill is a predetermined one of money kinds. When the bill is one of the predetermined money kinds, the conveyor motor 42 is further driven in the forward direction in Step 62. When the bill passes through the lever 34, the lever sensor 37 detects the end of the rotated lever 34 and in Step 63 generates an output which the CPU 40 receives. After the bill has passed through the lever 34, the CPU 40 ceases outputs to stop operation of the conveyor motor 42 from Step 64 to 75.

When the inserted bill is not genuine in Step 59 or when the bill is not any one of the predetermined money kinds in Step 61, the processing is moved to Step 73 wherein the CPU 40 drives the conveyor motor 42 in the reverse direction, and the bill is returned to the inlet 14. When the inlet sensors 21 to 23 detect nother in Step 74, operation of the conveyor motor 42 is stopped in Step 64, and then the processing moves to Step 75.

When ferrous component is not detected from the inserted bill in Step 53, the CPU 40 decides a bar coded coupon not a bill. During further rotation of the conveyor motor 42, the CPU 40 receives bar code data from the bar code sensor 24 or 25 in Step 65. In this stage, the CPU 40 decides whether to receive encoder pulses generated with rotation of the conveyor motor 42 in Step 66. Similarly to Step 56, the counter of the CPU 40 counts number of the pulses from the motor encoder 38, adding 1 to the counted value each time of detecting one encoder (Step 67). In step 68, the CPU 40 judges whether or not the counter reaches a predetermined counted value, and when the counter does not reach the predetermined counted value, the processing returns to Step 66. When the counter reaches the predetermined counted value, the processing moves to Step 69 from 68 to finish the counting of pulses. In Step 69, operation of the conveyor motor 42 is stopped, and subsequently bar code comparator of the CPU 40 compares the received bar code signals with the predetermined bar code patterns stored in the bar code pattern memory to determine whether or not these patters are coincident thereby determine whether the bar code is genuin or not (Step 70). When the CPU 40 decides that the bar code is genuine, the bar code data is indicated by the indicator 43 (Step 71). Also, the CPU 40 detects infrared permeation pattern of the coupon forwarded from the inlet sensors 21 to 23 and compares the infrared permeation pattern of the coupon with a pattern stored in a pattern memory to determine whether or not the coupon is genuine. When the CPU 40 decides that the infrared permeation pattern agrees with the stored pattern, the coupon is considered genuine, and processing is moved from Step 72 to 62. When the CPU 40 decides that bar code is not genuine in Step 70 or that the coupon is not genuine in Step 72, processing is moved to Step 73. In this way, the bill validator of the invention can discriminate both of bills and bar coded documents.

The mode of the embodiment of the present invention may be varied apart from the foregoing embodiment. An additional means may be provided for discriminating genuine or false of the bill in Step 59 of FIG. 4 by detecting infrared permeation pattern of the bill obtained from the inlet sensors 21 to 23 in addition to the magnetic detection pattern derived from the magnetic sensor 20. In lieu of checking of bar code after detection of magnetic component by the magnetic sensor 20 from the bill, the bilfl may be checked after checking of bar code. In the foregoing embodiment, bills and coupons are stacked in the same stacker 11, but otherwise may be stacked in different stackers after dividing the bills and coupons into different passageways at the outlet 14 by a suitable sorter means. The bill validator 10 may include means for invalidating documents which are considered not valid by the bar code comparator so that the invalidating means includes a printer for printing black on bar code of the invalidated document or means for cutting same.

What is claimed is:

1. A bill validator, comprising:
   conveyor means for transporting a bill inserted from an inlet to an outlet along a passageway;
   sensor means positioned in the vicinity of said passageway for detecting a magnetic or optical feature of the bill;
   a bar code detector means for photoelectrically converting bar code pattern printed on a document inserted into said inlet into electric signals, said bar code detector means connected with a discriminator means;
   said discriminator means for receiving signals from said sensor means to generate outputs in order to drive said conveyor means when said discriminator means detects a predetermined magnetic or optical pattern for a genuine bill, wherein said discriminator means comprises a bar code memory for storing predetermined bar code patterns and a bar code comparator for comparing bar code signals read out through said bar code detector means with bar code signals stored in said bar code memory, after or before said discriminator means decides whether said document is a genuine bill, said bar code comparator generating a drive signal to said conveyor means to transport said document to said outlet when said bar code comparator detects coincidence of said bar code signals from said sensor means and bar code memory.

2. The bill validator of claim 1 wherein said sensor means includes magnetic and optical sensors positioned in vicinity of said passageway for detecting magnetic and optical features of the bill.

3. The bill validator of claim 1 wherein said sensor means includes infrared sensor which generates permeation pattern of infrared ray passing through said documents.

4. The bill validator of claim 1 wherein said sensor means includes optical sensors positioned adjacent to said inlet of the bill validator.

5. The bill validator of claim 2 wherein said discriminator means includes a ferrous detector by receiving outputs of said magnetic sensor to detect ferrous component of said bill.

6. The bill validator of claim 1 wherein said bar code detector includes two bar code sensors positioned in parallel relation to each other for detecting bar code printed on one or both of front and back surfaces of said document.

7. The bill validator of claim 1 wherein said discriminator means includes a bill memory for storing predetermined magnetic or optical patterns;
   a bill comparator for comparing or optical signals read out through said sensor means with bill pattern signals stored in said bill memory, said bill comparator generating a drive signal to said conveyor means to transport said bill to said outlet when said bill comparator detects coincidence of said bill pattern signals from said sensor means and bill memory.

8. The bill validator of claim 1 wherein said optical sensor produces outputs which are used for validation of a bill.

9. The bill validator of claim 1 wherein said bar code memory and said bar code comparator are provided in said discriminator means.

10. The bill validator of claim 1 wherein said discriminator means detects bar code detection of whether or not the document is a genuine bill.

11. The bill validator of claim 1 wherein said discriminator means detects bar code detection of whether or not the document is a genuine bill.

12. The bill validator of claim 1 further comprising a motor encoder for generating pulses to detect exact position of said document within said passage.

13. The bill validator of claim 1 further comprising means for invalidating said document which i considered not valid.

14. The bill validator of claim 1 wherein said sensor means includes at least an inlet sensor capable of detecting overlapped bills from the amount of light passing through the bill.

* * * * *

UNITED STATES PATENT AND TRADEMARK OFFICE
CERTIFICATE OF CORRECTION

PATENT NO. : 5,420,406        Page 1 of 4
DATED     : May 30, 1995
INVENTOR(S) : HIKARU IZAWA ET AL.

It is certified that error appears in the above-identified patent and that said Letters Patent is hereby corrected as shown below:

On the Cover Page, in the Abstract, line 5, before "bar code" --a-- should be inserted, and on line 20, "meter control" should read --motor control--.

In Column 1, line 14, "4,659,126" should read --4,658,125--.

In Column 1, line 16, change "validtor" to read --validator--.

In Column 1, line 23, after "line" change "of" to read --on--.

In Column 1, line 24, change "terrous" to read --ferrous--.

In Column 1, line 26, change "certificates" to read --certificate--.

In Column 1, line 35, change "date" to read --data--.

In Column 1, line 54, change "data" to read --date--.

In Column 1, line 57, change "wining" to read --winning-- and after "number codes" delete the "." and insert a --,--.

In Column 1, lines 57-58, delete "couponig" and insert --coupon--.

In Column 1, line 65, change "wining" to read --winning--.

In Column 1, line 68, change "wining" to read --winning--.

In Column 2, line 7, change "collection" to read --collecting--.

In Column 2, line 49, change "outlet" to read --inlet--.

In Column 3, line 6, after "inlet" change "or" to read --of--.

In Column 3, line 12, delete "the".

UNITED STATES PATENT AND TRADEMARK OFFICE
CERTIFICATE OF CORRECTION

PATENT NO. : 5,420,406

DATED : May 30, 1995

INVENTOR(S) : HIKARU IZAWA ET AL.

It is certified that error appears in the above-identified patent and that said Letters Patent is hereby corrected as shown below:

In Column 3, line 31, change "valide" to read --valid--.

In Column 3, line 32, change "signal" to read --sensor--.

In Column 3, line 35, change "code" to read --coded--.

In Column 3, line 57, change "to" to read --10--.

In Column 3, line 67, change "ferruos" to read --ferrous--.

In Column 4, line 9, before "thickness" change "of" to read --or--.

In Column 4, line 30, change "LRI" to read --LRT--.

In Column 4, line 34, after "either" change "of" to read --or--.

In Column 4, line 43, after "bill" insert --or--.

In Column 4, line 55, change "pas" to read --pass--.

In Column 4, line 59, after "sensor 20," delete "in".

In Column 4, line 62, change "units" to read --unit--.

In Column 4, line 67, change "drivinly" to read --drivingly--.

In Column 5, line 1, after "amount" change "of" to read --or--.

In Column 5, line 21, change "th" to read --the--.

In Column 5, line 48, change "supplis" to read --supplies--.

UNITED STATES PATENT AND TRADEMARK OFFICE
CERTIFICATE OF CORRECTION

PATENT NO. : 5,420,406

DATED : May 30, 1995

INVENTOR(S) : HIKARU IZAWA ET AL.

It is certified that error appears in the above-identified patent and that said Letters Patent is hereby corrected as shown below:

In Column 5, line 68, change "exack" to read --exact--.

In Column 6, line 5, after "encoder" delete "30" and insert --38--.

In Column 6, line 12, change "steop" to read --stop--.

In Column 6, line 40, change "nother" to read --nothing--.

In Column 6, line 53, after "encoder" insert --pulse--.

In Column 6, line 64, change "patters" to read --patterns--.

In Column 6, line 65, change "genuin" to read --genuine--.

In Column 7, line 22, change "bilfl" to read --bill--.

In Column 8, claim 5, line 16, delete "by" and insert --for--.

In Column 8, claim 7, line 27, after "comparing" insert --magnetic--.

In Column 8, claim 11, line 46, after "code" insert --before--.

In Column 8, claim 13, line 52, after "which" delete "i" and insert --is--.

UNITED STATES PATENT AND TRADEMARK OFFICE
CERTIFICATE OF CORRECTION

PATENT NO. : 5,420,409
DATED : May 30, 1995
INVENTOR(S) : HIKARU IZAWA ET AL

It is certified that error appears in the above-indentified patent and that said Letters Patent is hereby corrected as shown below:

In Column 8, claim 13, line 52, after "which" delete "i" and insert —is—.

Signed and Sealed this

Seventeenth Day of October, 1995

Attest:

BRUCE LEHMAN

*Attesting Officer*  *Commissioner of Patents and Trademarks*